Dec. 8, 1964   S. KOWALSKI ETAL   3,160,168
VALVE WITH FEED BACK OPERATION CONTROL
Filed Oct. 18, 1961   2 Sheets-Sheet 2
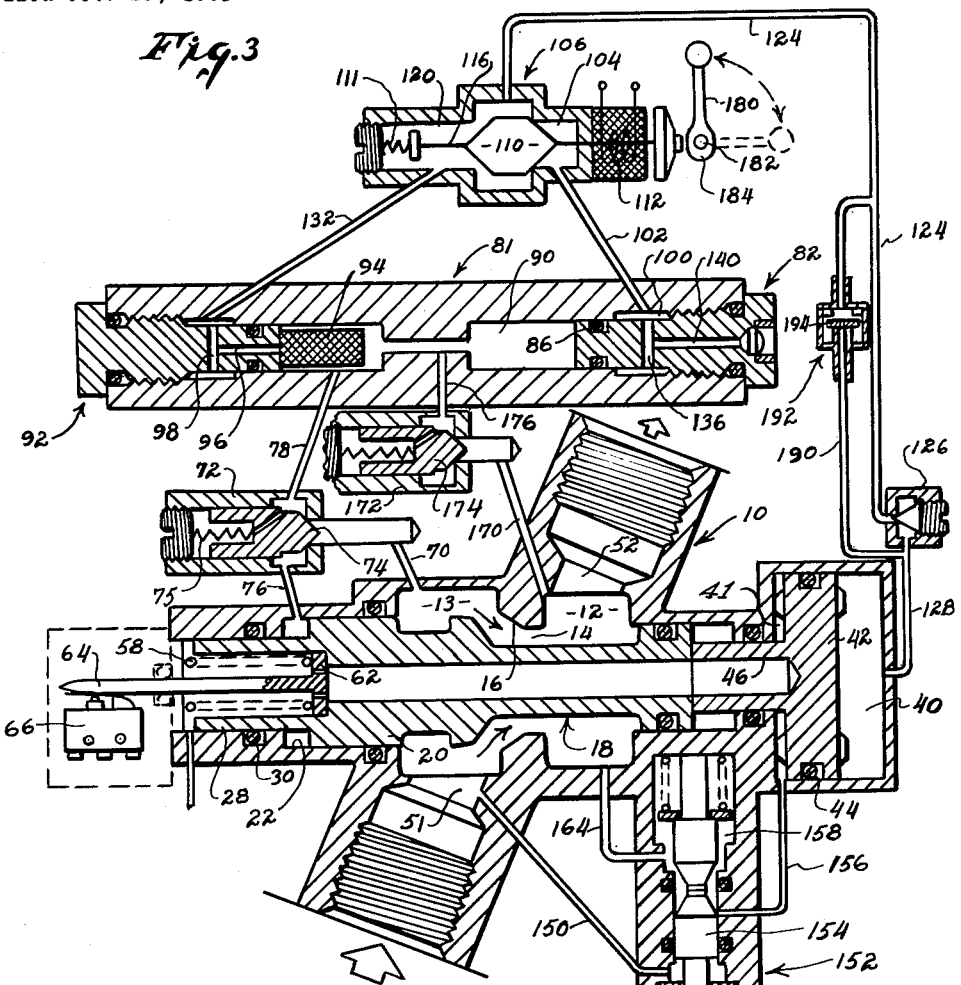
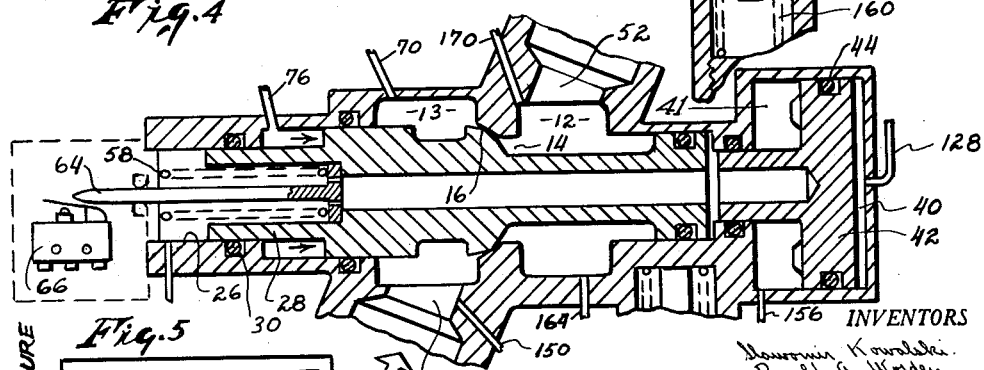
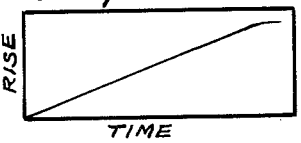
INVENTORS
ATTORNEYS

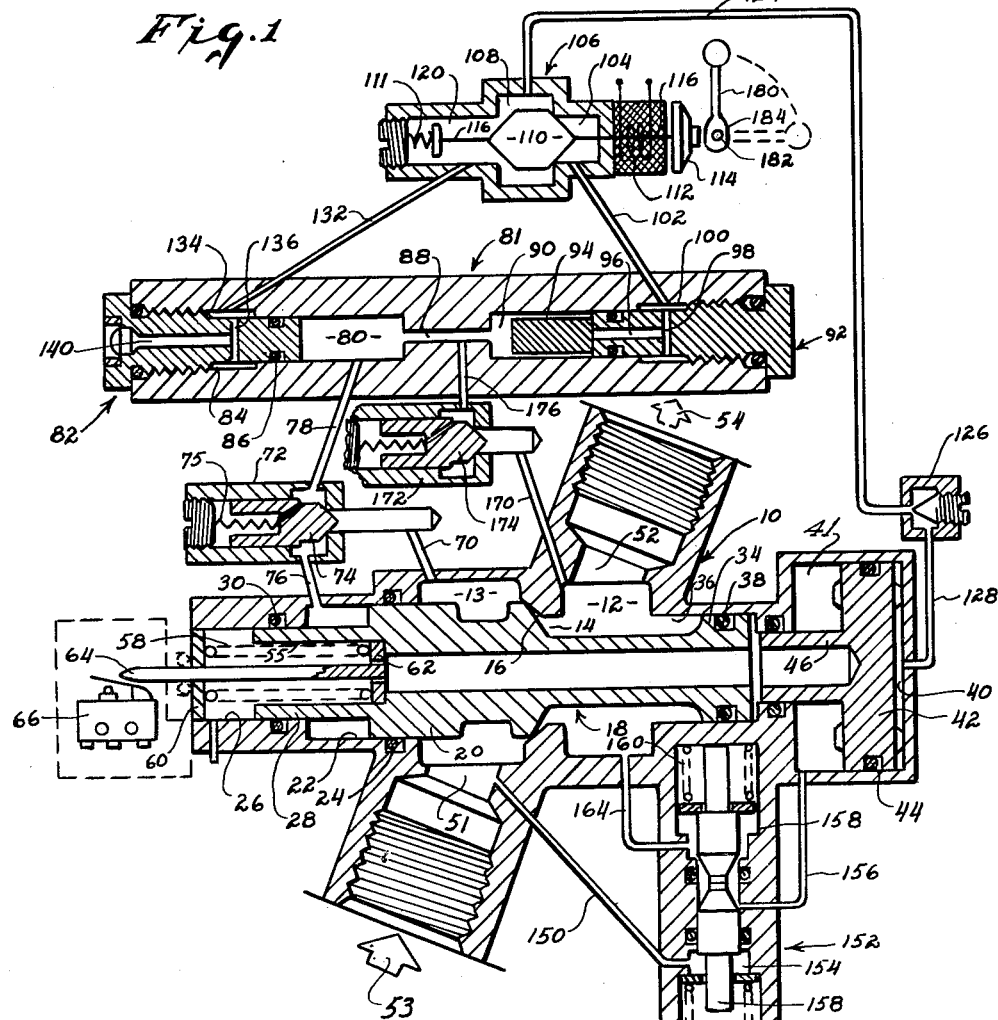

United States Patent Office 3,160,168
Patented Dec. 8, 1964

3,160,168
VALVE WITH FEED BACK OPERATION CONTROL
Slawomir Kowalski, Rockaway, and Donald A. Worden, Pompton Plains, N.J., assignors to Marotta Valve Corporation, Boonton, N.J., a corporation of New Jersey
Filed Oct. 18, 1961, Ser. No. 145,871
11 Claims. (Cl. 137—112)

This invention relates to improvements in valves and more especially pilot-controlled "regulator type" shut-off valves.

It is an object of the invention to provide a shut-off valve that produces a programed pressure rise which is free of heat-generating surges. In systems for handling high gas pressures, a surge compression into a void generates heat; and in the presence of even minute quanties of hydrocarbons (such as lubricants, contaminants, etc.) produce favorable conditions for spontaneous explosive diesel-type ignition. The hazard of such auto ignition is eliminated by the controlled, smooth operation of the valve of this invention.

Another object of the invention is to provide smoothness of operation of a valve by use of a pressure sensing actuator element with a pneumatic timer and a downstream pressure feed back.

Other objects, features and advantages of the invention will appear or be pointed out as the description proceeds.

In the drawing, forming a part hereof, in which like reference characters indicate corresponding parts in all the views:

FIGURE 1 is a diagrammatic sectional view showing a valve assembly made in accordance with this invention;

FIGURE 2 is a fragmentary sectional view of a portion of the assembly shown in FIGURE 1, but with the valve element in a different position;

FIGURE 3 is a diagrammatic sectional view similar to FIGURE 1 but showing certain parts of the assembly interchanged in order to change the assembly from one having the main valve normally closed to one having the main valve normally open;

FIGURE 4 is a diagrammatic sectional view showing a portion of the assembly of FIGURE 3, but with the main valve element in closed position; and FIGURE 5 is a pressure rise curve for the invention.

The valve assembly, shown in FIGURE 1, includes a main housing 10 having a first chamber 12 and a second chamber 13 which communicates with one another through an opening 14. There is a tapered face 16 around the opening 14 and a main valve element 18 contacts with the face 16 to shut off communication between the chambers 12 and 13 to the opening 14. FIGURE 1 shows the main valve element 18 in closed position; and FIGURE 2 shows it in open position.

At the left-hand end of the main valve element 18, it has a cylindrical portion which forms a piston element 20 which slides in a pressure chamber 22 formed in the main housing 10. There is a sealing ring 24 for preventing pressure from leaking past the piston element 20. In the construction illustrated, this sealing ring 24 is an O-ring located in a circumferential groove in the wall of the pressure chamber 22; but it will be understood that the O ring 24 could be located in a circumferential groove in the piston element.

Beyond the pressure chamber 22 there is a bore 26 opening through the end of the main valve chamber 10; and the valve element 18 has a cylindrical end portion 28 which slides in this bore 26. A sealing ring, consisting of an O ring 30 located in a circumferential groove in the wall of the bore 26, prevents leakage of gas from the pressure chamber 22 through the bore 26.

At the right hand end of the valve 18 there is a cylindrical portion 34 which reciprocates in a cyilndrical bearing surface 36 of the chamber 12; and this part of the valve element 18 has a sealing ring 38.

There is a pressure chamber 40 at the right hand end of the housing 10. This pressure chamber 40 contains a piston element 42, which reciprocates back and forth in the pressure chamber 40, and which has a sealing ring 44. The space in the chamber 40 on the left-hand side of the piston 42, is designated by the reference character 41. The piston element 42 has a rod 46 which abuts against the right hand end of the main valve 18 to move the main valve element 18 toward the left when the piston element 42 moves toward the left far enough to take up any lost motion between the rod 46 and the end face of the main valve 18.

A port 51 opens through the lower side of the housing 10 into the chamber 13. Another port 52 opens through the upper part of the housing 10 and into the chamber 12. There are threads along a part of the length of each of the ports 51 and 52 for receiving fittings. In the construction illustrated in FIGURE 1, the port 51 is the inlet port as indicated by an arrow 53; and the port 52 is an outlet port as indicated by an arrow 54. The valve will operate with the direction of flow reversed, but in describing the operation, it will be described with the port 51 communicating with a source of fluid under pressure.

There is a socket 55 in the left-hand end of the main valve element 18 and a compression spring 58 is located in this socket 55. The spring 58, which is preferably helical, exerts pressure between an end wall 60 of the housing 10 and the annular end face of the socket 55. The pressure of this spring 58 urges the valve element 18 toward the face 16 and holds the valve element 18 in its closed position, as shown in FIGURE 1, when there is not sufficient pressure on the right-hand side of the piston 42 to overcome the pressure of the spring 58.

An end plate 62, held in the socket 55 by the spring 58, has a probe 64 which extends beyond the end of the valve element 16 and through the end wall 60. This probe 64 operates a switch 66, to indicate the movement of the main valve 18.

A tube or passage 70 leads from the chamber 13 to a housing 72 which contains a check valve 74. This check valve 74 is urged toward closed position by a helical spring 75. Fluid which passes the check valve 74 goes through a passage 76 to the pressure chamber 22; and also flows through a passage 78 to a chamber 80 of the selector 81.

An end plug 82 screws into a counter bore 84 at the left-hand end of the chamber 80. The forward end of this plug 82 closes the left-hand end of the chamber 80 and has a sealing ring 86 for preventing leakage of fluid past the plug 82.

The chamber 80 has a passage 88 at its right-hand end, and this passage 88 leads into another chamber 90 which is closed at its right-hand end by a plug 92. There is a screen 94 on the front of the plug 92. Behind this screen 94 is a passage 96 leading through a portion of the plug to a cross drilling 98, which puts the passage 92 in communication with an annular chamber 100.

The fluid which flows from the chamber 80, through the passage 88, chamber 90, screen 94, passage 96 and cross drilling 98 travels through the annular chamber 100 to another passage 102 leading to an end chamber 104 in a pilot valve housing 106.

The end chamber 104 of the pilot valve housing communicates with a center chamber 108 except when a pilot valve 110 is at the right-hand end of its travel, where it is in a closed position, as shown in FIGURE 1. With the pilot valve 110 in this position, no fluid can escape from the chamber 104 into the center chamber 108; and the pilot valve 110 is held in this right-hand closed position by a helical compression spring 111.

When it is desired to open the pilot valve 110 to permit flow of fluid from the end chamber 104 to the center chamber 108, energy is supplied to a magnetic coil 112, which, when energized, attracts an armature 114 attached to the right hand end of a stem 116 of the pilot valve 110.

When the armature 114 is attracted to the magnetic coil 112, the pilot valve 110 is moved to the left against the pressure of the spring 111 and the pilot valve 110 closes communication between the center chamber 108 and a left hand end chamber 120.

The fluid flowing from the end chamber 104, past the open pilot valve 110 and into the center chamber 108 can then flow through tubing 124 to a throttle valve 126, and from the throttle valve 126 through tubing 128 to the right hand end of the pressure chamber 40.

The fluid which enters the pressure chamber 40 through the tubing 128 exerts pressure behind the piston element 42 and when the pressure builds up sufficiently, it moves the piston element 42 to the left to shift the main valve 18 into open position, as previously explained. The throttle valve 126 is preferably a needle valve and adjustable to change the rate of flow of fluid from the tubing 124 to the tubing 128. Thus the throttle valve 126 operates as a timer for determining how long, after operation of the pilot valve 110, it takes for the pressure in the chamber 40, behind the piston 42, to build up to the value necessary to move the main valve element 18 into open position.

When the magnetic coil 112 is de-energized and the pilot valve 110 moves to the right, under influence of the spring 111, and into the position shown in FIGURE 1, any pressure behind the piston element 42 is free to escape back through the tubing 128, throttle valve 126, tubing 124, center chamber 108 and end chamber 120 to a passage 132 which leads to an annular chamber 134 located in the selector 81 at a mid region of the plug 82. There is a cross drilling 136 in the plug 82 communicating with the axial exhaust passage 140 that opens through the end face of the plug 82.

Fluid which flows from the chamber 13 through the passage 70 and past the check valve 74 and the passage 76 to the pressure chamber 22 exerts a force which supplements the force of the spring 58 for moving the main valve 18 to the right and to closed position. This pressure causes the valve 18 to close as the fluid pressure in chamber 40 behind the piston 42 gradually decays. Rate of pressure decay in valve closing, and pressure buildup in chamber 40 in valve opening, is controlled by adjustment of the throttle valve 126. (Due to downstream pressure feed-back through a shuttle 154 to the balancing chamber 41 (to the left of piston 42) the downstream line pressure follows closely the pressure in the chamber 40 throughout the opening or closing cycle.)

In order to control the programming of the operation of the main valve 18, the apparatus of this invention is equipped with a pressure feed back. This includes a passage 150 leading from the port 51 and the chamber 13 to pressure-operated means, designated generally by the reference character 152. This pressure-operated means 152 moves a shuttle valve 154 back and forth to control the flow of fluid to a passage 156 leading to the balancing pressure chamber 41 on the left-hand side of the piston element 42.

The shuttle valve 154 has shoulders which contact with washers 158, and there are helical compression springs 160 behind each of the washers 158. These springs 160 normally hold the shuttle valve 154 in an intermediate position in which it acts as a sleeve valve to shut off flow of fluid to the passage 156 from both ends of the pressure-operating means 152.

Another passage 164 connects the chamber 12 with the interior of the pressure-operating means 152 above the shuttle valve 154. When the passage 150 is exposed to the high pressure, as in the condition selected for FIGURE 1, this pressure acting against the end of the shuttle valve 154 moves the shuttle valve upwardly against the pressure of the upper spring 160 and puts the passage 164 into communication with the passage 156, as shown in FIGURE 1.

If the flow through the valve housing were reversed, and the high pressure were in the chamber 12, then the pressure from that chamber passing through the passage 164 would move the shuttle 154 downwardly and this would put the passage 150 into communication with the passage 156 leading to the balancing pressure chamber 41. Thus the passage 156 and the balancing pressure chamber 41, on the left-hand side of the piston element 42, is always in communication with the chamber 12 or 13 which is subject to the lower pressure; that is, the chamber which is in communication with the discharge or downstream portion of the piping or tubing in which the fluid flow is to be controlled by the main valve element 18.

The valve chamber 12 of the main housing 10 communicates through a passage 170 with a housing 172 of a check valve 174. Fluid which passes this check valve 174 flows through another passage 176 to the selector 81; but when the chamber 12 is the low pressure chamber of the fluid circuit, no fluid flows through the passage 170 and the check valve 174 merely serve to prevent flow of fluid from the chamber 13 to the chamber 12 through the selector 81 and the passages 170 and 176.

When the valve apparatus shown in FIGURE 1 is being used with the port 52 as the inlet port, and the port 51 as the exhaust port, then conditions are reversed and the high-pressure fluid flows upwardly through the passage 170, past the check valve 174, and through the passages 176 and 88 to the chamber 80 from which the fluid can flow through passage 78, check valve housing 72 and passage 76 to the pressure chamber 22. In such a case, the chamber 13 is the low pressure chamber and there is no flow of fluid through the passage 70. Check valve 74 prevents fluid from flowing from the chamber 12 to the chamber 13.

From the description thus far it will be apparent that the operation of the main valve 18 is controlled by the energizing and de-energizing of the magnetic coil 112; through the shuttle valve 154 and check valves 74 and 174 operate automatically (by pressure) and quite independently of the solenoid pilot valve. When no power is available for energizing the magnetic coil 112, the valve can be manually operated by means of a handle 180 supported on a pivot 182 and connected to a cam 184 which displaces the armature 114 whenever the handle 180 is moved from the solid-line position to the dotted-line position, indicated in FIGURE 1. When the handle 180 is in its solid-line position, the spring 111 holds the pilot valve 110 in its right-hand position, whereas the cam 184 holds the pivot valve 110 in its left-hand position when the handle 180 is in the dotted-line position.

FIGURE 2 shows the main valve element 18 and the associated structure in the positions occupied when the piston element 42 has been moved toward the left by pressure supplied through the tubing 128. FIGURE 3 shows the same apparatus as shown in FIGURES 1 and 2, but with the plugs 82 and 92, in the selector 81, reversed from one side to the other. Thus the plug 82, which is the exhaust plug for the selector 81 is located at the right-hand end of the selector 81 and in position to receive fluid from the passage 102. The plug 92, through which fluid under pressure is supplied to the pilot valve housing 106, and eventually to the tubing 124 and 128 and to the pressure dome or pressure chamber 40, is in communication with the passage 132.

With this assembly shown in FIGURE 3, the pressure from the chamber 13 is transmitted through the passage 70, past the check valve 74, through the passage 78, plug 92 and passage 132, to the end chamber 120 of the pilot valve housing 106. Since the pilot valve 110 is normally held in the position shown in FIGURE 3, as the result of the pressure of the spring 111, fluid is free to flow through the pilot valve housing 106, tubing 124, throttle valve 126, and tubing 128 to maintain pressure against the right hand side of the piston element 42 so that the valve 118 remains in open position as long as the magnetic coil 112 is not energized and as long as the handle 180 is left in its raised, full-line position.

When the coil 112 is energized, or the handle 180 operated, to move the pilot valve 110 to the left hand end of its stroke, pressure in the pressure chamber 40, on the right hand side of the piston element 42, is free to escape throuugh the tubing 128, throttle valve 126, tubing 124, center chamber 108, end chamber 104, passage 102, and through the plug 82 to the outside atmosphere.

The pressure chamber 22 at the left-hand end of the main valve element 18 is supplied with high pressure fluid from the chamber 13 through the passage 70, past the check valve 74 and through the passage 76 in the same way as in FIGURE 1 since the interchanging of the plugs 82 and 92 in the fitting 81 does not have any effect on the connections of the pressure chamber 22 with the chamber 13 of the main valve housing 10.

From an inspection of the connections in the assembly shown in FIGURE 3, it will be apparent that this arrangement will leave the main valve element 18 as a normally open valve even though the port 52 is used as the inlet port and the port 51 as the outlet port. The effect from changing from one port to the other for inlet or outlet has already been explained in connection with FIGURE 1.

It will also be apparent that the interchanging of the plugs 82 and 92, in the selector 81, in order to make the valve 18 a normally open valve, does not affect the operation of the shuttle valve 154 which has also been explained in connection with FIGURE 1. This shuttle valve still operates to put the balancing pressure chamber 41 in communication with the chamber 12 or 13 which contains the low pressure; that is, which is in communication with the port 51 or 52 that is the discharge port.

FIGURE 4 is a view similar to FIGURE 3, but showing the positions of the parts when the main valve element 18 is in closed position. This occurs when the pilot valve 110 is moved, as previously described, to permit exhaust of pressure from the pressure chamber 40 through the tubing 128 and connecting circuits shown in FIGURE 3. The position of the parts in FIGURE 4 correspond with those shown in FIGURE 1, but they occur in response to excitation of the magnetic coil 112 (FIGURE 3), instead of in response to the de-energizing of this coil, as was the case in the construction shown in FIGURE 1.

In order to obtain an exhaust through the tube 124 faster than the flow of fluid through this tube toward the chamber 40, FIGURE 3 includes a by-pass 190 around the throttle valve 126. This by-pass 190 includes a check valve 192 with a valve element 194 which closes when fluid is flowing toward the chamber 40. The valve element 194 has a bleed passage opening through it to permit some flow when in closed position but the check valve 192 can be made with a solid valve element for stopping all flow through the by-pass in one direction, and in such a case all fluid flowing to the chamber 40 must flow through the throttle valve 126, resulting in a slow, controlled opening of the valve 18.

When the pilot valve 106 moves into position for exhaust of fluid from the chamber 40, the fluid moving up through the by-pass 190 lifts the valve element 194 and flows rapidly around the open valve element 194 and from the upper end of the by-pass through the tubing 124 to the pilot valve 106. This rapid exhaust refinement, providing a fast closing with a slow opening of the valve 18, is shown in FIGURE 3 but can be used in the same position in FIGURE 1.

The preferred embodiment of the invention has been illustrated diagrammatically and no attempt has been made to show which parts are actually enclosed in the same castings in the commercial embodiment of the invention. Such an illustration is much more difficult to understand because parts are located behind others and are not visible in any single section. The piecing together of different sectional views is confusing and less satisfactory than the diagrammatic illustration used in the drawing. It will be understood that changes and modifications can be made, that terms of orientation are relative, and that the actual correlation of the positions of parts may vary widely without departing from the invention as defined in the claims.

What is claimed is:

1. A valve assembly including a first valve chamber and a second valve chamber separated from one another by a valve seat surrounding an opening through which the valve chambers communicate with one another, a valve element movable toward and from the seat, piston elements operatively connected with opposite ends of the valve element, separate pressure chambers in which the different piston elements operate as pistons, the first and second valve chambers each having a main fluid port for intake and outlet of fluid, a pilot valve, passages through which each of the first and second valve chambers communicate with the pilot valve, valve means for selectively making one or the other of said passages effective as a fluid supply passage for the pilot valve, a pilot flow passage between the pilot valve and one of the pressure chambers, a feed-back passage through which at least one of the valve chambers communicates with the pressure chamber connected with the pilot flow passage, the feed-back passage communicating with the pressure chamber on the side of the piston element of that pressure chamber opposite to the side subject to the fluid pressure supplied through the pilot flow passage.

2. The valve assembly described in claim 1, and in which there are passages and valve means putting both of the pressure chambers in communication with a different one of the valve chambers, and an adjustable throttle valve in series with the pilot valve for regulating the rate of flow of fluid through one of said passages and to one of the pressure chambers to control the rate of movement of the valve element away from the seat and the resulting pressure wave when the valve is used to control the flow of light pressure gas.

3. The valve assembly described in claim 2, and in which the valve means include check valves in the passages in position to prevent flow through said passages from the first valve chamber to the second valve chamber and from the second valve chamber to the first valve chamber.

4. The valve assembly described in claim 3, and in which there is a system of passages including separate passages leading from the first and second valve chambers and other passages that connect with the pressure chambers, and said separate passages are in parallel relation in the passage system, and one of the check valves is in each of the parallel related passages and is oriented to open to flow of fluid out of the first or second passage and to close against inward flow through said first or second passage.

5. The valve assembly described in claim 1, and in which the feed-back passage connects with both the first and second valve chambers and there is a shuttle valve movable into different positions to put either of said first or second valve chambers selectively into communication with the pressure chamber with which the feed-back passage communicates.

6. The valve assembly described in claim 5, and in which the shuttle valve includes pressure-operated means connected with the first and second valve chambers and operable by pressure therein to move the shuttle valve into position to put the feed-back into communication with that chamber which has the lower pressure.

7. The valve assembly described in claim 1, and in which the pilot valve is a three-port valve with a center chamber into which a center port opens, two end chambers into each of which a different end port opens, and a pilot valve element movable into different positions to put the center port selectively into communication with one or the other of the end ports, the center port being the one that communicates with the pilot flow passage leading to one of the pressure chambers.

8. The valve assembly described in claim 7, and in which one of the end ports of the pilot valve is an exhaust port and the other end port is a part of the passage connecting the pilot valve with one of said first and second valve chambers.

9. The valve assembly described in claim 7, and in which one of the end ports of the pilot valve is an exhaust port and the other is a part of a passage system including two passages in parallel relation and with each one connecting with a different one of said first and second valve chambers, and valve means for controlling the flow of fluid through said two passages.

10. The valve assembly described in claim 9, and in which the valve means include a check valve in each of the passages that are in parallel relation to one another, each of the check valves being oriented to open to flow from said first or second chamber and to close to flow toward said first or second chamber.

11. The valve assembly described in claim 1, and in which there is a system of passages including separate passages leading from the first and second chambers to other passages that communicate with the pressure chambers, and said separate passages are in parallel relation in the passage system, a check valve in each of the parallel related passages and being oriented to permit flow away from one of said first and second chambers and to prevent flow toward that chamber, and in which the feed-back passage connects with both the first and second chambers and there is a shuttle valve movable into different positions to put either of said first or second chambers selectively into communication with the pressure chamber with which the feed-back communicates, and the shuttle valve includes pressure-operated means connected with the first and second chambers and operable by the pressure therein to put the feed-back into communication with the chamber having the lower pressure therein, and in which the pilot valve is a three-port valve with a center chamber into which a center port opens, and each of the end chambers has an end port opening into it, and the pilot valve element is movable into different positions to put the center port selectively into communication with the different end ports, the center port being the one that supplies fluid to a pressure chamber, one of the end ports being an exhaust port, and the other of the end ports being a part of said system of passages.

References Cited in the file of this patent
UNITED STATES PATENTS

| | | |
|---|---|---|
| 2,398,775 | Beekley | Apr. 23, 1946 |
| 2,624,365 | Hesson | Jan. 6, 1953 |
| 2,925,984 | Kowalski | Feb. 23, 1960 |
| 2,926,882 | Russell | Mar. 1, 1960 |